(12) United States Patent
Prina et al.

(10) Patent No.: US 10,011,272 B2
(45) Date of Patent: Jul. 3, 2018

(54) METHOD TO CONTROL AN ELECTRIC MOTOR WITH ADJUSTMENT OF THE VALUE OF THE EQUIVALENT IMPEDANCE

(71) Applicant: Ferrari S.p.A., Modena (IT)

(72) Inventors: Barbara Prina, Colonno (IT); Alessandro Barone, Bologna (IT)

(73) Assignee: Ferrari S.p.A., Modena (IT)

( * ) Notice: Subject to any disclaimer, the term of this patent is extended or adjusted under 35 U.S.C. 154(b) by 116 days.

(21) Appl. No.: 15/255,546

(22) Filed: Sep. 2, 2016

(65) Prior Publication Data

US 2017/0088126 A1  Mar. 30, 2017

(30) Foreign Application Priority Data

Sep. 3, 2015 (IT) .................. 102015000048422

(51) Int. Cl.
*B60L 3/00* (2006.01)
*B60W 20/50* (2016.01)
*B60L 11/14* (2006.01)

(52) U.S. Cl.
CPC .......... *B60W 20/50* (2013.01); *B60L 3/0061* (2013.01); *B60L 11/14* (2013.01); *B60L 2240/421* (2013.01); *B60L 2240/423* (2013.01); *B60L 2240/425* (2013.01); *B60L 2240/427* (2013.01); *B60L 2240/527* (2013.01); *B60W 2510/08* (2013.01); *B60W 2710/08* (2013.01); *B60Y 2300/60* (2013.01); *B60Y 2400/112* (2013.01); *Y10S 903/906* (2013.01)

(58) Field of Classification Search
CPC ............... B60L 15/20; B60L 2240/441; B60L 2240/486; B60L 2240/423; B60L 2240/427; B60L 3/0061; B60K 6/00; B60K 6/44; B60K 6/485; B60K 6/52; B62D 5/046; B60W 10/06; B60W 10/08; B60W 20/00; B60W 2510/0638; B60W 2510/083; B60W 2520/28
USPC .................. 701/22, 42, 31.4; 180/213, 446; 318/400.01, 400.22, 432, 799; 903/902, 903/916

See application file for complete search history.

(56) References Cited

U.S. PATENT DOCUMENTS 6,411,052 B1   6/2002 Mir et al.
6,837,217 B1 * 1/2005 Hoshino ............... F02D 11/105
                                                                  123/399

(Continued)

OTHER PUBLICATIONS

A. Hughes, "Electric Motors and Drives," pp. 1, 80, 89-93, Dec. 31, 1990.

*Primary Examiner* — Dalena Tran
(74) *Attorney, Agent, or Firm* — Blank Rome LLP (57) ABSTRACT

A method to control an electric motor including the steps of: determining a target torque; calculating a target current by dividing the target torque by a torque constant; determining an equivalent impedance by means of a predetermined map; calculating the voltage drop by multiplying the target current by the equivalent impedance; calculating a counter-electromotive force by multiplying an actual rotation speed by a speed constant; determining a control voltage to be applied to the power supply terminals of the electric motor by adding the voltage drop to the counter-electromotive force; determining an offset parameter; and correcting the equivalent impedance provided by the predetermined map by applying the offset parameter.

13 Claims, 6 Drawing Sheets

(56) References Cited

U.S. PATENT DOCUMENTS

2005/0211489 A1\* 9/2005 Kowatari ................ B60K 6/44
                                                          180/243
2012/0080259 A1   4/2012 Ueda et al.
2013/0035816 A1   2/2013 Pettigrew et al.

\* cited by examiner

METHOD TO CONTROL AN ELECTRIC MOTOR WITH ADJUSTMENT OF THE VALUE OF THE EQUIVALENT IMPEDANCE

TECHNICAL FIELD

The present invention relates to a method to control an electric motor.

The present invention finds advantageous application to the control of an electric motor which causes the rotation of a carrier shaft of the pumps of a lubrication system of a transmission of a hybrid vehicle, to which the following description will make explicit reference without implying any loss of generality.

PRIOR ART

A hybrid vehicle comprises an internal combustion heat engine, which transmits the drive torque to the drive wheels by means of a transmission provided with a gearbox coupled to a clutch, and at least one electric machine which is electrically connected to an electricity storage system and is mechanically connected to the drive wheels. Normally, the electric machine is mechanically connected to the drive wheels through the gearbox, so that it is possible to modify (by using at least part of the gears of the gearbox) the existing transmission ratio between the electric machine and the drive wheels to prevent the electric machine from over-speeding (namely rotating the electric machine at too high of a speed) and also to try to operate the electric machine at a favourable speed (namely at a speed which allows to obtain a high energy efficiency).

The transmission comprises a hydraulic system, which has the function to circulate, through the transmission itself (that is, through the gearbox and the clutch) a lubricant oil necessary for the lubrication and the cooling of all the components and an actuation oil necessary for the operation of the hydraulic actuators (used for engaging the gears and for the clutch control). Consequently, the hydraulic system generally comprises a circulation pump for the circulation of the lubricant oil and a pump for the actuation and the pressurization of the actuation oil.

In the transmissions currently in production market, the pumps of the hydraulic system are operated by an auxiliary carrier shaft which obtains its motion directly and permanently by the drive shaft (namely upstream of the clutch) so as to be always caused to rotate also when the clutch is open. However, this type of connection requires to always keep in rotation (with considerable frictions and inertias) the electric motor even in the case of purely electric traction to ensure the operation of the pumps of the hydraulic system.

In order to allow the operation of only the electric machine without having to also cause the movement of the heat engine, it has been proposed to make the carrier shaft of the pumps of the hydraulic system of the transmission, mechanically independent from the drive shaft and to rotate the carrier shaft only by means of a dedicated auxiliary electric motor; however, this solution is not very efficient from the energy point of view, because when the heat engine is running (that is, for most of the time during the use of the vehicle) it is more efficient to use part of the drive torque generated by the electric motor to directly operate auxiliary means rather than convert part of the drive torque generated by the heat engine into electric energy that is transformed back into mechanical torque by an auxiliary electric motor.

In order to increase energy efficiency when the heat engine is operating, it has been proposed to connect the carrier shaft of the pumps of the lubrication system of the transmission both to a dedicated auxiliary electric motor, and to the carrier shaft of the heat engine by means of corresponding freewheels (or idler wheels) which transmit or not transmit the motion (namely engage or not engage) depending on the direction of the speed difference. In this way, when the heat engine is running is the heat engine which directly cause the rotation of the carrier shaft of the pumps of the lubrication system of the transmission while the auxiliary electric motor remains still; on the contrary, when the heat engine is stopped it is the auxiliary electric motor which directly causes the rotation of the carrier shaft of the pumps of the lubrication system.

Generally, the auxiliary electric motor is a "sensorless BLDC" electric motor which allows generating a sufficiently high drive torque while, on a whole, having relatively reduced cost, weight and overall dimensions (considering both the electric machine as is, and the corresponding electronic power converter). However, the "sensorless BLDC" electric motors and the respective commercial wiring and controlling devices have a high construction dispersion (namely a high construction tolerance) in all components, and therefore the overall electromechanical characteristics may also vary widely from system to system; when the overall electromechanical characteristics differ significantly from the rated electromechanical characteristics the control of the electric motor loses its efficiency (namely does not allow to achieve the rated performance) or of effectiveness (namely can set in protection mode the power electronics in the case of excessive electric current, thus causing the shutdown of the electric motor).

The article XP002757329 (Austin Hughes: "*ELECTRIC MOTORS AND DRIVES*", Dec. 31, 1990) describes a method to control an electric motor in which the current is calculated by dividing the torque by a constant torque, the voltage drop is calculated by multiplying the current by the equivalent impedance, the counter-electromotive force is calculated by multiplying an actual rotation speed by a constant speed, and the controlling voltage to be applied to power supply terminals of the electric motor is calculated by adding the voltage drop to the counter-electromotive force.

The patent application US2012080259 describes the control of an electric motor which provides power assistance to a steering system of the front wheels of a vehicle; in particular, the patent application US2012080259A1 describes the obtaining of the equivalent resistance of the electric motor from a map stored in a memory ("map holding unit 55") and to correct the map through an offset parameter that is provided by a calculation unit ("map updating unit 54").

The U.S. Pat. No. 6,411,052 B1 describes a method for compensating the variations of the estimated resistance in the control of electric motors; in particular, the estimated resistance is corrected when the electric current calculated using a model of the motor is significantly different from the actual electric current (based on the difference between calculated electric current and actual electric current a regression factor is determined, which is a number, and compensates for the error in the estimated resistance).

SUMMARY OF THE INVENTION

The object of the present invention is to provide a method to control an electric motor, which allows to improve the operation of the electric motor by compensating the negative effects of constructive dispersion of the components and at the same time is easy and inexpensive to produce.

According to the present invention a method to control an electric motor, as claimed by the appended claims is provided.

BRIEF DESCRIPTION OF THE DRAWINGS

The present invention will now be described with reference to the accompanying drawings, which illustrate a non-limiting embodiment, wherein.

PREFERRED EMBODIMENTS OF THE INVENTION

Figure 1:
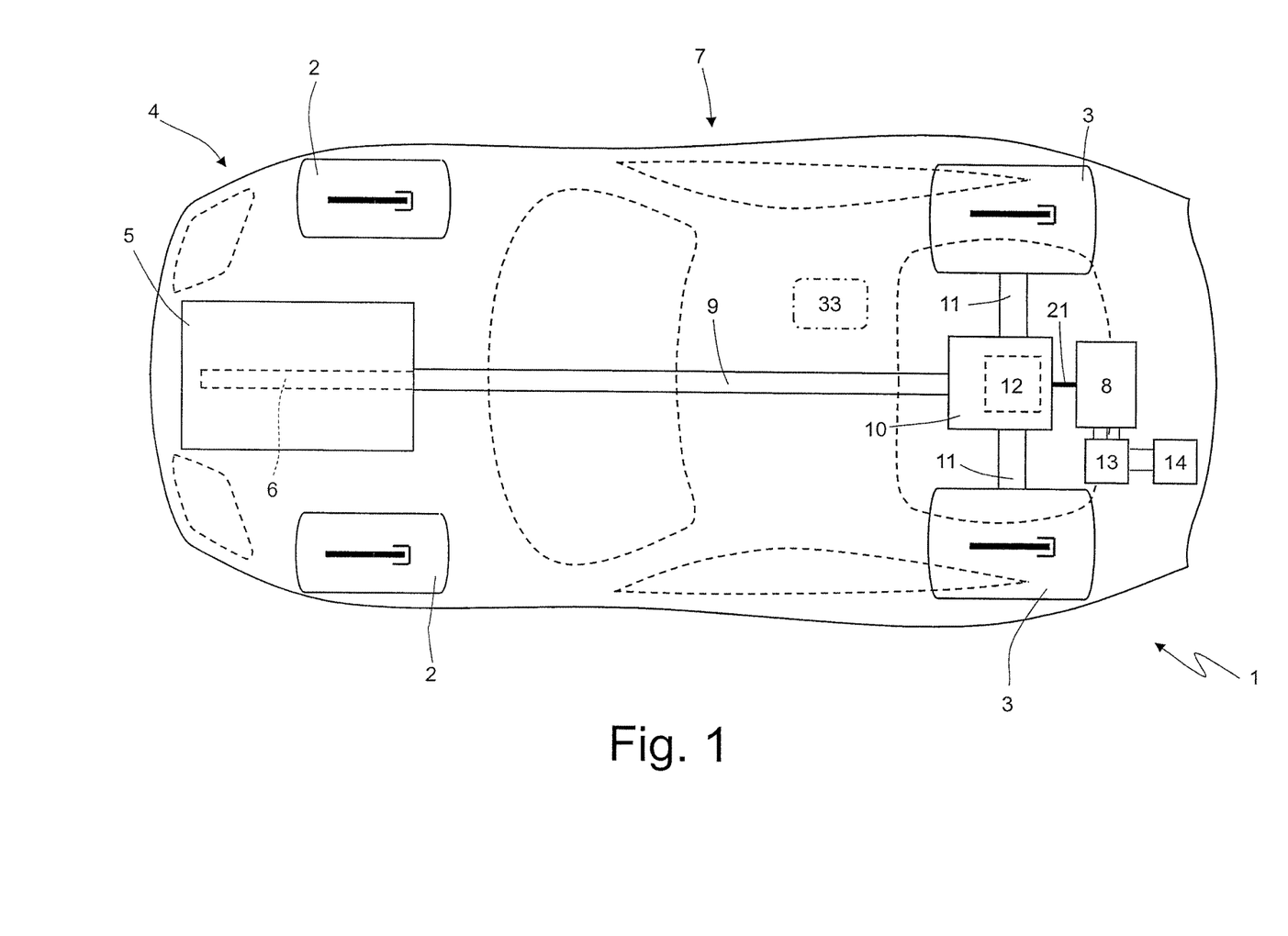
FIG. 1 is a schematic view of a road vehicle with hybrid propulsion.

In FIG. 1, number 1 denoted as a whole a road vehicle with hybrid propulsion having two front wheels 2 and two rear drive wheels 3, which receive the drive torque from a 4 hybrid powertrain system.

The hybrid powertrain system 4 comprises an internal combustion heat engine 5, which is arranged in a front position and is provided with a drive shaft 6, a transmission 7, which transmits the drive torque generated by the heat engine 5 to the rear drive wheels 3, and a reversible electric machine 8 (that is, which can function both as an electric motor by absorbing electric energy and generating a mechanical drive torque, and as electric generator by absorbing mechanical energy and generating electric energy) which is mechanically connected to the transmission 7.

The transmission 7 comprises a transmission shaft 9 which on one side is angularly integral with drive shaft 6 and the other side is mechanically connected with a dual clutch gearbox 10, which is arranged in the rear position and transmits the motion to the rear drive wheels 3 by means of two axle shafts 11 that receive the motion from a differential 12. The reversible electric machine 8 is mechanically connected to the dual clutch gearbox 10 as will be described later and is controlled by an electronic power converter 13 connected to an accumulation system 14 which is designed to store electric energy and is provided with chemical and/or super-capacitor batteries.

Figure 2:
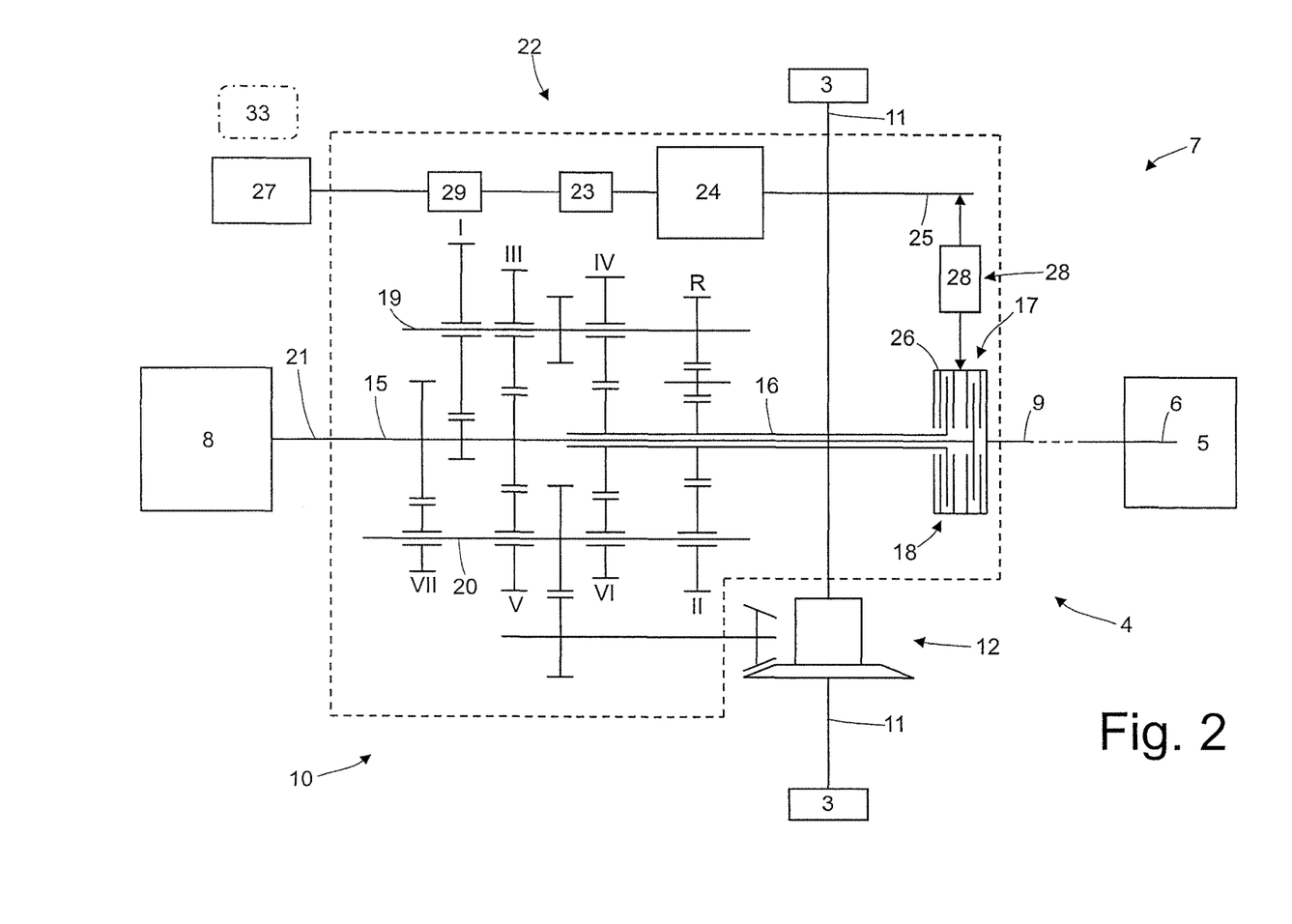
FIG. 2 is a schematic view of a transmission of the road vehicle of FIG. 1 provided with a hydraulic system.

As illustrated in FIG. 2, the dual clutch gearbox 10 comprises two primary shafts 15 and 16 coaxial to each other, independent and inserted one inside the other and two clutches 17 and 18 coaxial and arranged in series, each of which is designed to connect a primary shaft 15 or 16 to the transmission shaft 9 (therefore to the drive shaft 6 of the internal combustion heat engine 5). Moreover, the dual clutch gearbox 10 comprises two secondary shafts 19 and 20, both of which are angularly integral with the entrance of the differential 11 which transmits the motion to the rear drive wheels 3. The electric machine 8 has a shaft 21, which is permanently connected to the primary shaft 15 so as to always rotate integrally with the primary shaft 15 itself.

The transmission 7 comprises a hydraulic system 22 (only partly and schematically illustrated in FIG. 2), which has the function to circulate a lubricant oil needed for the lubrication of all the components and an actuation oil necessary for the operation of the hydraulic actuators (used for the engagement of the gears in the gearbox 10 and for the control of the clutches 17 and 18) through the transmission 7 itself (that is, through the gearbox 10 and the clutches 17 and 18). The hydraulic system 22 of the transmission 7 comprises a circulation pump 23, which has the function to circulate the lubricant oil through the gearing of the gearbox 10 and the discs of the clutches 17 and so as to ensure an adequate lubrication and an adequate cooling. Furthermore, the hydraulic system 22 of the transmission 7 comprises an actuation pump 24 providing the hydraulic pressure needed to operate the hydraulic actuators for engaging the gears (that is, the actuators of the synchronizers of the gearbox 10) and the actuators for controlling the clutches 17 and 18.

The two pumps 23 and 24 of gearbox 10 are operated by a through auxiliary carrier shaft 25 (that is, which passes through each pump 23 and 24) which on one side is caused to rotate by a front drum 26 of the clutches 17 and 18 which is integral with the drive shaft 6 (with the interposition of the transmission shaft 9) and from the opposite side is caused to rotate by an auxiliary electric motor 27 (for example a "sensorless BLDC" electric motor—"Brushless Direct Current"). Between the carrier shaft 25 and the drive shaft 6 (namely between the carrier shaft 25 and the front drum 26 of the clutches 17 and 18) a freewheel 28 (or idle wheel 28) is interposed, which transmits or does not transmit the motion (that is, engages or does not engage) depending on the direction of the speed difference. Similarly, also between the carrier shaft 25 and the auxiliary electric motor 27 a freewheel 29 (or idle wheel 29) is interposed, which transmits or does not transmit (namely engages or does not engage) depending on the direction of the speed difference.

When the heat engine 5 is turned on (namely when the drive shaft of the heat engine 5 is rotating), the auxiliary electric motor 27 is kept turned off: the rotation speed imparted to the carrier shaft 25 by the drive shaft 6 of the heat engine 5 exceeds the rotation speed imparted to the carrier shaft 25 by the auxiliary electric motor 27 (which is stopped), and then the freewheel 28 is engaged and transmits the motion towards the pumps 23 and 24 while the freewheel 29 is not engaged and "separates" the auxiliary electric motor 27 from the carrier shaft 25; in other words, the carrier shaft 25 is rotated by the drive shaft 6 of the heat engine 5 while the carrier shaft 25 is isolated from the auxiliary electric motor 27.

When the heat engine 5 is turned off (namely when the drive shaft 6 of the heat engine 5 is stopped), the auxiliary electric motor 27 is activated: the rotation speed imparted to the carrier shaft 25 by the drive shaft 6 of the heat engine 5 (which is stopped) is lower than the rotation speed imparted to the carrier shaft 25 by the auxiliary electric motor 27 and then the freewheel 29 is engaged, and therefore transmits the motion to the pumps 23 and 24 while the freewheel 28 is not engaged and separates the drive shaft 6 of the heat engine 5 from the carrier shaft 25; in other words; the carrier shaft 25 is rotated by the auxiliary electric motor 27 while the carrier shaft 25 is insulated from the drive shaft 6 of the heat engine 5.

Figure 3:
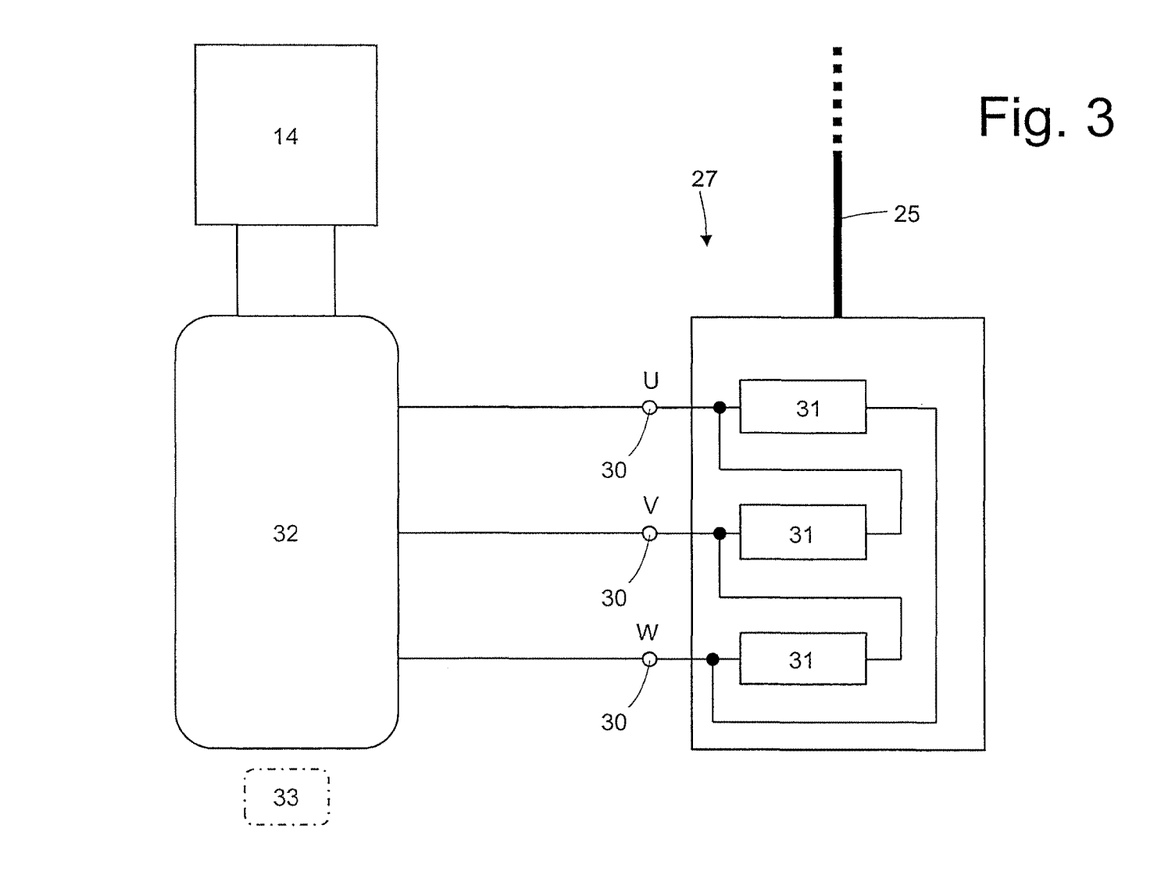
FIG. 3 is a schematic view of an auxiliary electric motor of the hydraulic system of FIG. 2, which auxiliary electric motor is controlled according to the control method of the present invention.

As illustrated in FIG. 3, the auxiliary electric motor 27 is a three-phase alternating current electric motor having power supply terminals 30 through which the electric energy is transmitted. In the schematic representation of FIG. 3, inside of the auxiliary electric motor 27 three equivalent impedances 31 connected together in a triangle (but could also be connected in a star shape) are illustrated; of course in reality the internal electric circuit of the auxiliary electric motor 27 is much more complex and articulated than what schematically shown in FIG. 3. The auxiliary electric motor 27 is controlled by a power electronic converter 32 connected to the storage system 14; the power electronic converter 32 converts the DC current supplied by the storage system 14 into three-phase alternating current at variable frequency to control the auxiliary electric motor 27.

A control unit 33 is provided, which supervises the operation of the hydraulic system 22, and then, among other things, controls the power electronic converter 32 to operate, when necessary, the auxiliary electric motor 27 (namely to turn on the auxiliary electric motor 27 in case of purely electric traction with the heat engine 5 turned off).

Figure 4:
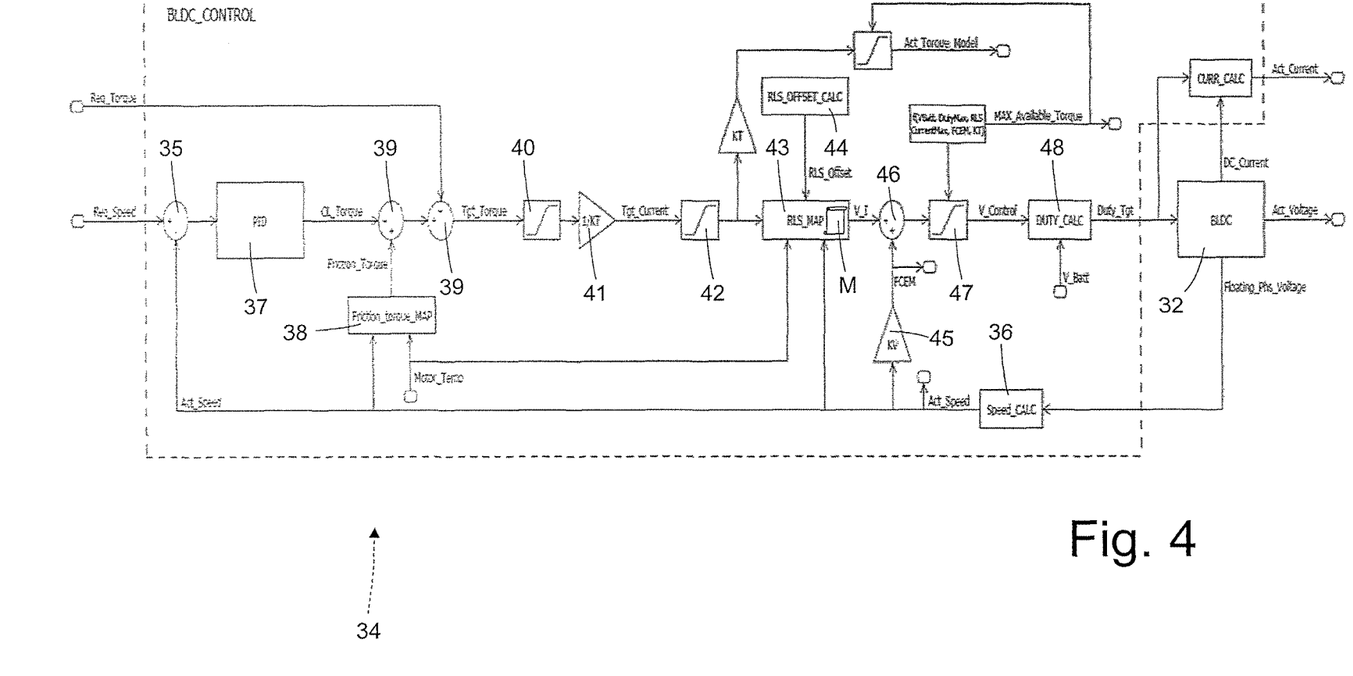
FIG. 4 is a block diagram which illustrates a control logic used for controlling the auxiliary electric motor of FIG. 3.

As illustrated in FIG. 4, inside the control unit 33 a control module 34 is provided, which supervises the operation of the auxiliary electric motor 27 by directly controlling the power electronic converter 32. The control module 34 receives as input the requested torque Req_Torque that must be applied by the auxiliary electric motor 27 to the carrier shaft 25 (being determined mainly based on the requested pressure of the oil used for the hydraulic actuation, namely the oil pumped by the actuation pump 24) and the requested rotation speed Req_Speed that the auxiliary electric motor 27 must impart to the carrier shaft 25 (being determined mainly based on the requested flow rate of the oil used for lubrication, namely the oil pumped by the circulation pump 23). In a subtractor block 35 the actual rotation speed Act_Speed (estimated by an estimator block 36 based on the voltage phase Floating_Phs_Voltage of the electric motor 27) is subtracted from the requested rotation speed Req_Speed to calculate a speed error which is provided to a PID control block 37 which determines the sustenance torque CL_Torque needed to obtain the requested rotation speed Req_Speed. An estimator block 38 determines by means of a map (being experimentally determined and stored in a non-volatile memory of the control unit 33) a friction torque Friction_Torque which is equal to the mechanical friction inside the auxiliary electric motor 27; the map provides the friction torque Friction_Torque based on the actual rotation speed Act_Speed and on the internal temperature Motor_Temp of the auxiliary electric motor 27 (measured by a temperature sensor or estimated in the absence of the temperature sensor). Two adding blocks 39 add, one to the other, the requested torque Req_Torque, the sustenance torque CL_Torque, and the friction torque Friction_Torque to determine the target torque Tgt_Torque. The target torque Tgt_Torque is filtered through a limiting block 40 which limits the maximum value of the target torque Tgt_Torque (so as not to exceed the mechanical limits of the auxiliary electric motor 27), and then is supplied to a calculation block 41, which calculates the target current Tgt_Current by dividing the target torque Tgt_Torque by the torque constant KT (which is a fixed parameter that never changes, is determined experimentally and is stored in a non-volatile memory of the control unit 33).

The target current Tgt_Current is filtered through a limiting block 42 which limits the maximum value of the target current Tgt_Current (so as not to exceed the limits of the auxiliary electric motor 27), and then is supplied to a calculation block 43 which calculates the voltage drop V_I inside the auxiliary electric motor 27 by multiplying the target current Tgt_Current by the equivalent impedance RLS of the auxiliary electric motor 27; the equivalent impedance RLS of the auxiliary electric motor 27 is provided by a map M (being experimentally determined and stored in a non-volatile memory of the control unit 33) based on the internal temperature of the auxiliary electric motor 27 and on the actual rotation speed Act_Speed. A compensator block 44 (described in detail hereinafter) is provided, which provides an offset parameter RLS_offset (consisting of a single numeric value) that is added to the equivalent impedance RLS of the auxiliary electric motor 27 supplied by the map M and serves to compensate for the effect of the constructive dispersion (namely the construction tolerance) of the different components; the offset parameter RLS_offset is algebraically added to the equivalent impedance RLS of the auxiliary electric motor 27 provided by the map M, namely the offset parameter RLS_offset can be negative or positive and therefore can decrease or increase the value of the equivalent impedance RLS.

A calculation block 45 determines the counter-electromotive force EMF of the auxiliary electric motor 27 by multiplying the actual rotation speed Act_Speed by the speed constant KV (which is a fixed parameter that never changes, is determined experimentally and is stored in a non-volatile memory of the control unit 33). An adding block 46 determines the voltage control V_Control to be applied to the power supply terminals 30 of the electric motor 27 by adding the voltage drop V_I inside the auxiliary electric motor 27 to the counter-electromotive force EMF of the auxiliary electric motor 27. Downstream of the adding block 46 a limiting block 47 is arranged, which limits the maximum value of the voltage control V_Control (so as not to exceed the limits of the auxiliary electric motor 27). The voltage control V_Control is supplied to a calculation block 48 which determines in a known manner the target duty-cycle Duty_Tgt, which is used to control the power electronic converter 32 based on the battery voltage V_Batt (namely the calculation block 48 determines when to partialise in time the battery voltage V_Batt to obtain, on average, the application of the voltage control V_Control).

Figure 5:
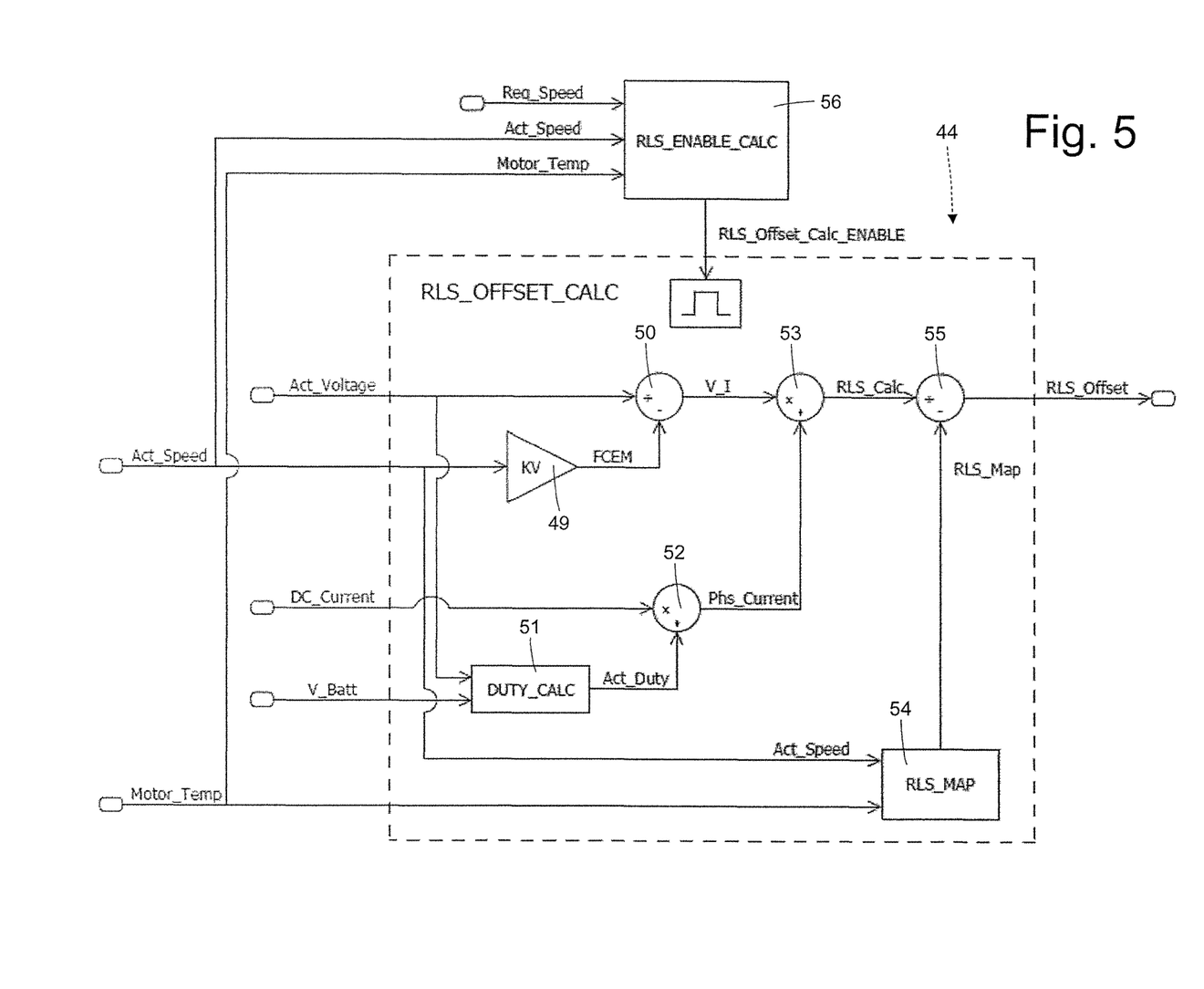
FIG. 5 is a block diagram illustrating the method for determining an offset parameter of the equivalent impedance of the auxiliary electric motor of FIG. 3.

As illustrated in FIG. 5, the compensator block 44 determines the offset parameter RLS_offset based on the actual rotation speed Act_Speed (estimated by the estimator block 36 as described above), the inner temperature Motor_Temp of the auxiliary electric motor 27, the actual voltage Act_Voltage at the power supply terminals 30 of the electric motor 27, the battery voltage V_Batt, the requested rotation speed Req_Speed, and the DC current DC_Current which enters into the power supply terminals 30 of the electric motor 27.

A calculation block 49 (entirely similar to the calculation block 45) is provided, which determines the counter-electromotive force EMF of the auxiliary electric motor 27 by multiplying the actual rotation speed Act_Speed by the speed constant KV. A subtractor block 50 determines the voltage drop V_I inside the auxiliary electric motor 27 by subtracting the counter-electromotive force FCEM of the auxiliary electric motor (calculated by the calculation block 49) from the actual voltage Act_Voltage at the power supply terminals 30 of the electric motor 27.

A calculation block 51 determines the actual duty-cycle Act_Duty that is used for controlling the power electronic converter 32 based on the actual voltage Act_Voltage and on the battery voltage V_Batt; in other words, the calculation block 51 performs the same type of calculation performed by the calculation block 48 which determines the target duty-cycle Duty_Tgt based on the battery voltage V_Batt and on the voltage control V_Control). A divider block 52 calculates the current phase Phs_Current of the auxiliary electric motor 27 by dividing the DC current DC_Current that enters into the power supply terminals 30 of the electric motor 27 by the actual duty-cycle Act_Duty that is used to control the power electronic converter 32. A divider block 53 calculates the estimated equivalent impedance RLS_Calc of the auxiliary electric motor 27 by dividing the voltage drop V_I inside the 27 auxiliary electric motor by the current phase Phs_Current of the auxiliary electric motor 27.

A calculation block 54 (totally similar to the calculation block 43) estimates the map equivalent impedance RLS_MAP of the auxiliary electric motor 27 by means of the map M and based on the inner temperature of the auxiliary electric motor 27 and on the actual rotation speed Act_Speed. A subtracter block 55 determines the offset parameter RLS_offset by subtracting the map equivalent impedance RLS_MAP of the auxiliary electric motor from the estimated equivalent impedance RLS_Calc of the auxiliary electric motor 27. In other words, the offset parameter RLS_offset is determined based on the difference between the map equivalent impedance RLS_MAP of the auxiliary electric motor 27 being determined based on the map M and the estimated equivalent impedance RLS_Calc of the auxiliary electric motor 27 being determined based on voltage and current estimates.

The calculation block 44 is associated to an activator block 56 which activates the calculation of the offset parameter RLS_offset only in certain conditions, namely only when the auxiliary electric motor 27 has recovered its thermal condition (namely when the inner temperature Motor_Temp of the auxiliary electric motor 27 is operational, that is, it is above a predetermined threshold) and in the neighbourhood of a predetermined operating point P (established based on the actual rotation speed Act_Speed and on the requested rotation speed Req_Speed that indicates whether the actual rotation speed Act_Speed is stable or is likely to change significantly); in other words, the activator block 56 determines the offset parameter RLS_offset only when the inner temperature Motor_Temp of the auxiliary electric motor 27 exceeds a predetermined threshold and only when the actual rotation speed Act_Speed of the electric motor 27 is stable and is in the neighbourhood of a predetermined value. In this way, the offset parameter RLS_offset is determined so as to have the maximum precision possible (and thus the maximum possible efficacy) in the operating point P of the auxiliary electric motor 27 where it is most needed (namely in the operating point P of the auxiliary electric motor 27 where the negative effects of constructive dispersion of the components produce the greatest problems).

Figure 6:
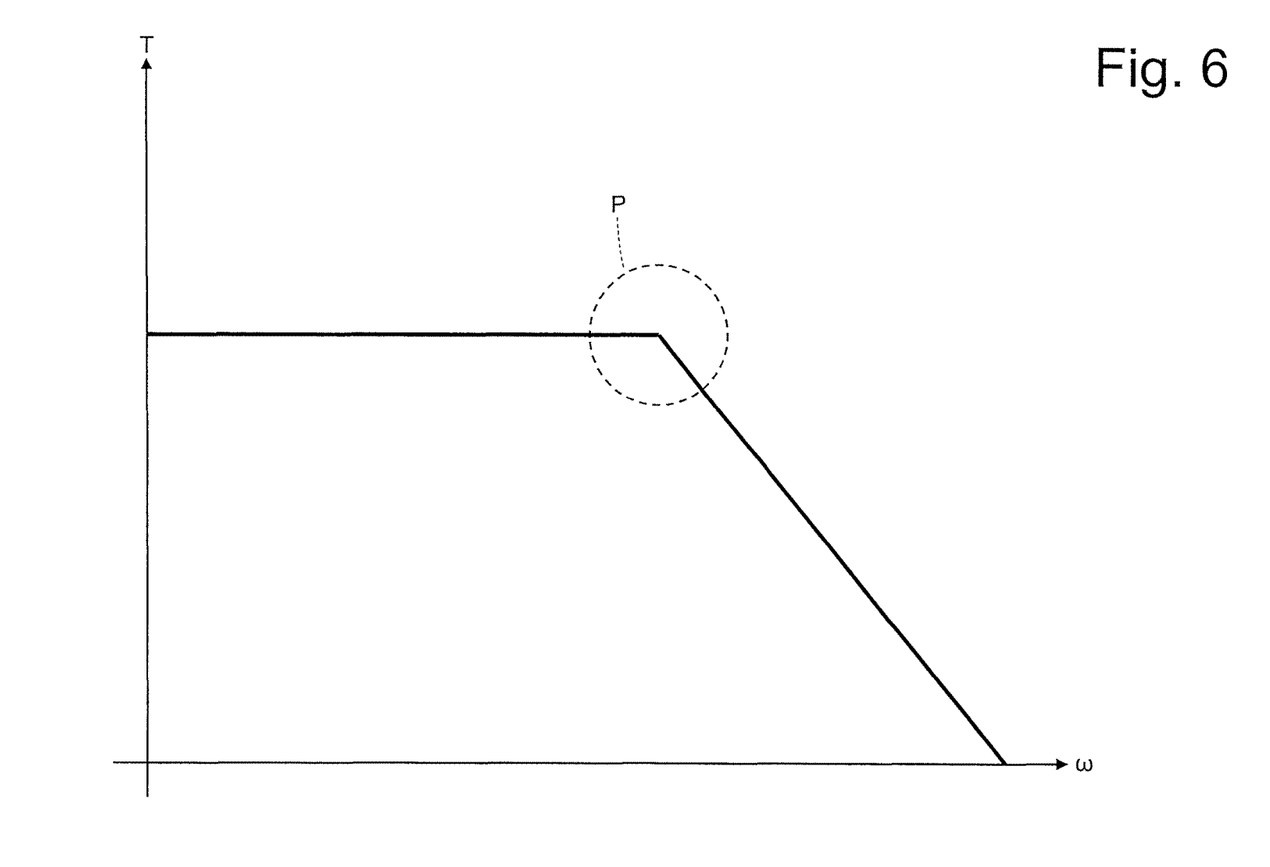
FIG. 6 is a graph illustrating the torque-rotation speed characteristic of the auxiliary electric motor of FIG. 3.

As illustrated in FIG. 6, the BLDC type auxiliary electric motor 27 has a torque curve (namely the characteristic that correlates the torque T to the rotation speed ω) having an initial section wherein the torque T is constant as the rotation speed increases ω and an end section wherein the torque T decreases as the rotation speed increases ω (in FIG. 6 a linear decrease of the torque T with the increasing rotation speed ω is illustrated, but could also be a parabolic decrease of the torque T as the rotation speed increases ω); the two sections of the torque curve of the auxiliary electric motor 27 are connected to each other in an elbow where a noticeable change of slope is performed.

The operating point P wherein the offset parameter RLS_offset is determined, is arranged at the elbow of the characteristic torque-rotation speed of the auxiliary electric motor 27. In fact, as illustrated in FIG. 6, the characteristic torque-rotation speed of the auxiliary electric motor 27 has a pronounced elbow which connects two differently sloped substantially linear sections with different slope: the initial section where the torque T is substantially constant with as the rotation speed increases ω and an end section where the torque T decreases to zero as the rotation speed increases ω. By choosing the operating point P wherein the offset parameter RLS_offset is determined at the elbow of the characteristic torque-rotation speed of the auxiliary electric motor 27 the effectiveness of the offset parameter RLS_offset can be maximized. In fact, at the elbow of the characteristic torque-rotation speed the auxiliary electric motor 27 is more difficult to control because of the local non-linearity, and therefore it is precisely in this area that it is necessary to provide, as accurately as possible, the voltage drop V_I inside of the auxiliary electric motor 27. Furthermore, in the moments of maximum effort (that is, of maximum load), therefore in the most critical moments, the auxiliary electric motor 27 is operated at the elbow of the characteristic torque-rotation speed because in this area the auxiliary electric motor 27 generates the maximum torque T (which allows to obtain the maximum hydraulic pressure) at a high rotation speed ω (which allows to obtain a high hydraulic flow rate); it is therefore important that in moments of maximum effort (that is, of maximum load) the auxiliary electric motor 27 is controlled in the best possible way.

Preferably, the calculation block 44 cyclically performs the calculation of the offset parameter RLS_offset both to apply statistical calculations that allow to reduce the incidence of accidental errors, and to constantly update the estimate so as to pursue any drift over time of the components.

In the embodiment described above, the offset parameter RLS_offset consists of a single numerical value; alternatively, the offset parameter RLS_offset may vary based on the actual rotation speed Act_Speed and/or of the inner temperature Motor_Temp of the electric motor (27).

It is important to note that based on an alternative and completely equivalent embodiment, at least one of the maps mentioned above can be replaced by a corresponding mathematical model that has the same input/output coordinates of the maps; as the map, also the corresponding mathematical model is normally experimentally built by using a plurality of measurements performed by means of laboratory instruments.

The control method described above has numerous advantages.

First, the above described control method allows to effectively compensate for the negative effect of the constructive dispersion; in fact, by correcting the equivalent impedance RLS of the auxiliary electric motor 27 by way of using the offset parameter RLS_offset the negative effect of the constructive dispersion can be significantly limited. In particular, an underestimation of the equivalent impedance RLS of the auxiliary electric motor 27 leads to apply a current higher than necessary thus risking to send in protection the power electronics for the excessive electric current consequently determining the shutdown of the electric motor 27 (therefore preventing the continuation of electric traction); instead, an overestimation of the equivalent impedance RLS of the auxiliary electric motor 27 leads to apply a current lower than necessary thus significantly reducing the performance of the electric motor 27 (namely hindering the electric motor 27 from reaching the rated performance).

To summarize, the control method described above allows to obtain a high strength to the constructive dispersion (namely to the construction tolerance) even without a rotation speed sensor and without a current phase sensor (sensors that would considerably increase the overall cost of the electric motor 27).

Furthermore, the control method described above is simple and inexpensive to implement, since it does not require the addition of any physical component (namely the hardware system is not modified in any way), but it is completely achievable via software. It is important to note that the control method described above does not required neither a high calculation capacity, nor an extended amount of memory and therefore its actuation is possible in a known control unit without the need for updates or upgrades.

The invention claimed is:

1. A method to control an electric motor, the control method comprising the steps of:
   determining a target torque;
   calculating a target current by dividing the target torque by a torque constant;
   determining an equivalent impedance using a predetermined map;
   calculating a voltage drop by multiplying the target current by the equivalent impedance;
   calculating a counter-electromotive force by multiplying an actual rotation speed by a speed constant;
   determining a control voltage to be applied to power supply terminals of the electric motor by adding the voltage drop to the counter-electromotive force; and
   applying the control voltage to the power supply terminals of the electric motor;
   wherein the electric motor is of BLDC type and has a torque curve that correlates a torque generated by the electric motor to a corresponding rotation speed of the electric motor, having an initial section wherein the torque is constant as the rotation speed increases and an end section wherein the torque decreases as the rotation speed increases; the two sections of the torque curve of the electric motor are connected to each other in an elbow where a change in slope is performed;
   the control method further comprising the steps of:
   determining an offset parameter when the rotation speed of the electric motor is at the elbow of the torque curve of the electric motor; and
   correcting the equivalent impedance provided by the predetermined map by applying the offset parameter.

2. The control method according to claim 1, wherein the offset parameter consists of a single numerical value, which can increase or decrease the equivalent impedance provided by the predetermined map.

3. The control method according to claim 1, wherein the offset parameter is added to or subtracted from the equivalent impedance provided by the predetermined map.

4. The control method according to claim 1, wherein the offset parameter is determined when an inner temperature of the electric motor exceeds a predetermined threshold.

5. The control method according to claim 1, wherein the step of determining the offset parameter comprises the further steps of:
   determining a map equivalent impedance using the predetermined map;
   determining a voltage drop;
   determining a phase current; calculating an estimated equivalent impedance by dividing the voltage drop by the phase current; and
   determining the offset parameter by comparing the map equivalent impedance with the estimated equivalent impedance.

6. The control method according to claim 5, further comprising the steps of:
   calculating the counter-electromotive force by multiplying the actual rotation speed by the speed constant; and
   calculating the voltage drop by subtracting the counter-electromotive force from an actual voltage at the power supply terminals of the electric motor.

7. The control method according to claim 5, further comprising the steps of:
   determining an actual duty cycle which is used to control an electronic power converter of the electric motor based on the actual voltage and on a battery voltage; and
   calculating a phase current by multiplying a direct current flowing into the power supply terminals of the electric motor by the actual duty cycle.

8. The control method according to claim 1, further comprising the steps of:
   calculating a speed error by subtracting the actual rotation speed from a requested rotation speed;
   determining a sustenance torque based on the speed error using a PID controller;
   determining a friction torque based on the actual rotation speed and on an inner temperature of the electric motor; and
   calculating the target torque by adding the sustenance torque, the friction torque and a requested torque to be delivered by the electric motor.

9. The control method according to claim 1, wherein the torque constant is a constant number, which never changes.

10. The control method according to claim 1, wherein the speed constant is a constant number, which never changes.

11. The control method according to claim 1, wherein the electric motor is part of a hydraulic system of a transmission of a vehicle and causes the rotation of a carrier shaft on which a circulation pump, which allows a lubricant oil to circulate, and/or an actuation pump, which provides the hydraulic pressure needed to operate the transmission is fitted.

12. The control method according to claim 11, wherein the electric motor causes the rotation of the carrier shaft through an interposition of a first freewheel.

13. The control method according to claim 12, wherein the hydraulic system comprises a second freewheel, which is designed to connect the carrier shaft to a drive shaft of an internal combustion heat engine.

* * * * *